(12) United States Patent
Lai

(10) Patent No.: US 6,862,758 B1
(45) Date of Patent: Mar. 8, 2005

(54) BED PANEL ASSEMBLY

(75) Inventor: Yung-Tsai Lai, Taichung (TW)

(73) Assignee: Hsing Lyiang Industry Co., LTD, Taichung (TW)

( * ) Notice: Subject to any disclaimer, the term of this patent is extended or adjusted under 35 U.S.C. 154(b) by 0 days.

(21) Appl. No.: 10/754,142

(22) Filed: Jan. 9, 2004

(51) Int. Cl.$^7$ ................................................ A47C 19/02
(52) U.S. Cl. .............. 5/299; 5/288; 5/303; 248/222.41; 403/316; 403/381; 403/DIG. 11; 403/DIG. 13
(58) Field of Search .......................... 5/299, 288, 303, 5/292, 296, 289, 282.1; 403/316, 381, DIG. 11, DIG. 13; 248/222.41, 239

(56) References Cited

U.S. PATENT DOCUMENTS

| | | | | |
|---|---|---|---|---|
| 1,337,012 A | * | 4/1920 | Goodwin | 5/299 |
| 2,628,372 A | * | 2/1953 | Metzger | 5/286 |
| 4,786,119 A | * | 11/1988 | Smuda | 312/195 |

FOREIGN PATENT DOCUMENTS

| | | | |
|---|---|---|---|
| FR | 427496 | * | 8/2004 |
| GB | 563975 | * | 9/1944 |
| IT | 451841 | * | 9/1949 |

* cited by examiner

Primary Examiner—Alexander Grosz
(74) Attorney, Agent, or Firm—Christie, Parker & Hale, LLP

(57) ABSTRACT

A bed panel assembly includes a vertical bedpost, a bed panel having a connecting end with a positioning piece that has neck and head portions, and a retaining unit mounted on the bedpost. The retaining unit includes a base plate having a retaining hole with large and small hole sections and a first passage, and a retainer having two resilient arms that confine a clamping hole for receiving the neck portion and that respectively include free ends which define a second passage therebetween. The free ends are resiliently movable away from each other to enlarge the second passage when the neck portion is forced to pass through the same.

6 Claims, 9 Drawing Sheets

BED PANEL ASSEMBLY

BACKGROUND OF THE INVENTION

1. Field of the Invention

The invention relates to a bed panel assembly, more particularly to a bed panel assembly that can be assembled and disassembled with relative ease.

2. Description of the Related Art

Referring to FIGS. 1 and 2, a conventional bed assembly 1 includes a main frame 2, and front and rear panel assemblies 3, 4 connected respectively to front and rear portions of the main frame 2.

The main frame 2 includes two opposite side bars 21, each of which has two link seats 22 connected respectively to opposite ends thereof. Each of the link seats 22 has a pair of hook members 221.

With further reference to FIG. 3, the front panel assembly 3 includes two front bedposts 31, and a front panel 32 disposed between the front bedposts 31. Each of the front bedposts 31 has a connecting seat 311 located at a bottom-part thereof for engagement with the hook members 221 of the link seat 22 of the adjacent side bar 21 so that the front bedposts 31 are secured stably on the main frame 2. Because the connections between the front bedposts 31 and the opposite sides of the front panel 32 are the same, only the connection at one side of the front panel 32 will be described hereinbelow.

Referring to FIG. 4, a plurality of pins 5 are first disposed between the front bedpost 31 and the front panel 32, after which an adhesive is applied to adjoining surfaces of the front bedpost 31 and the front panel 32. The front bedpost 31 and the front panel 32 are thus adhered together, thereby completing assembly of the front panel assembly 3.

Referring again to FIGS. 1 and 2, the rear panel assembly 4 includes two rear bedposts 41, and a rear panel 42 disposed between the rear bedposts 41. Each of the rear bedposts 41 has a connecting seat (not shown) for engagement with the hook members 221 of the link seat 22 of the adjacent side bar 21. Since the connections between the rear bedposts 41 and the rear panel 42 are substantially similar to those of the front bedposts 31 and the front panel 32, a detailed description of the same will be dispensed herewith for the sake of brevity.

From the aforementioned description of the conventional bed assembly 1, it is noted that although the bed posts 31, 41 of the front and rear panel assemblies 3, 4 are connected respectively and stably to the front and rear panels 32, 42 through the pins 5 and the adhesive, a lot of time is wasted during assembly. Furthermore, the conventional bed assembly 1 is difficult to disassemble. Most importantly, since assembly of the conventional bed assembly 1 is complicated and is seldom accomplished by consumers, the assembled main frame 2 and front and rear panel assemblies 3, 4 are bulky, thereby resulting in higher handling space requirements and higher delivery costs.

SUMMARY OF THE INVENTION

Therefore, the object of the present invention is to provide a bed panel assembly that can be assembled and disassembled with relative ease.

According to this invention, a bed panel assembly comprises a vertical bedpost, a bed panel, and a retaining unit. The bed panel has a connecting end. The connecting end has a positioning piece projecting therefrom. The positioning piece has a neck portion connected to the connecting end, and a head portion opposite to the neck portion. The retaining unit is mounted on the bedpost, and includes a base plate and a retainer secured to and placed in face-to-face contact with the base plate. The base plate has a retaining hole with a large hole section, a small hole section, and a first passage between the large and small hole sections. The retainer has a pair of resilient arms confining a clamping hole substantially in alignment with the small hole section. The resilient arms respectively include connecting ends which are interconnected, and free ends opposite to the connecting ends. The free ends define therebetween a second passage substantially in alignment with the first passage. The second passage is narrower than the first passage. The head portion has a cross-section greater than that of the small hole section and smaller than that of the large hole section. The neck portion is movable between the large and small hole sections through the first passage. The clamping hole receives the neck portion when the neck portion is disposed in the small hole section. The second passage has a normal size smaller than the cross-section of the neck portion to permit retention of the neck portion. The free ends are resiliently movable away from each other to enlarge the second passage when the neck portion is forced to pass through the second passage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
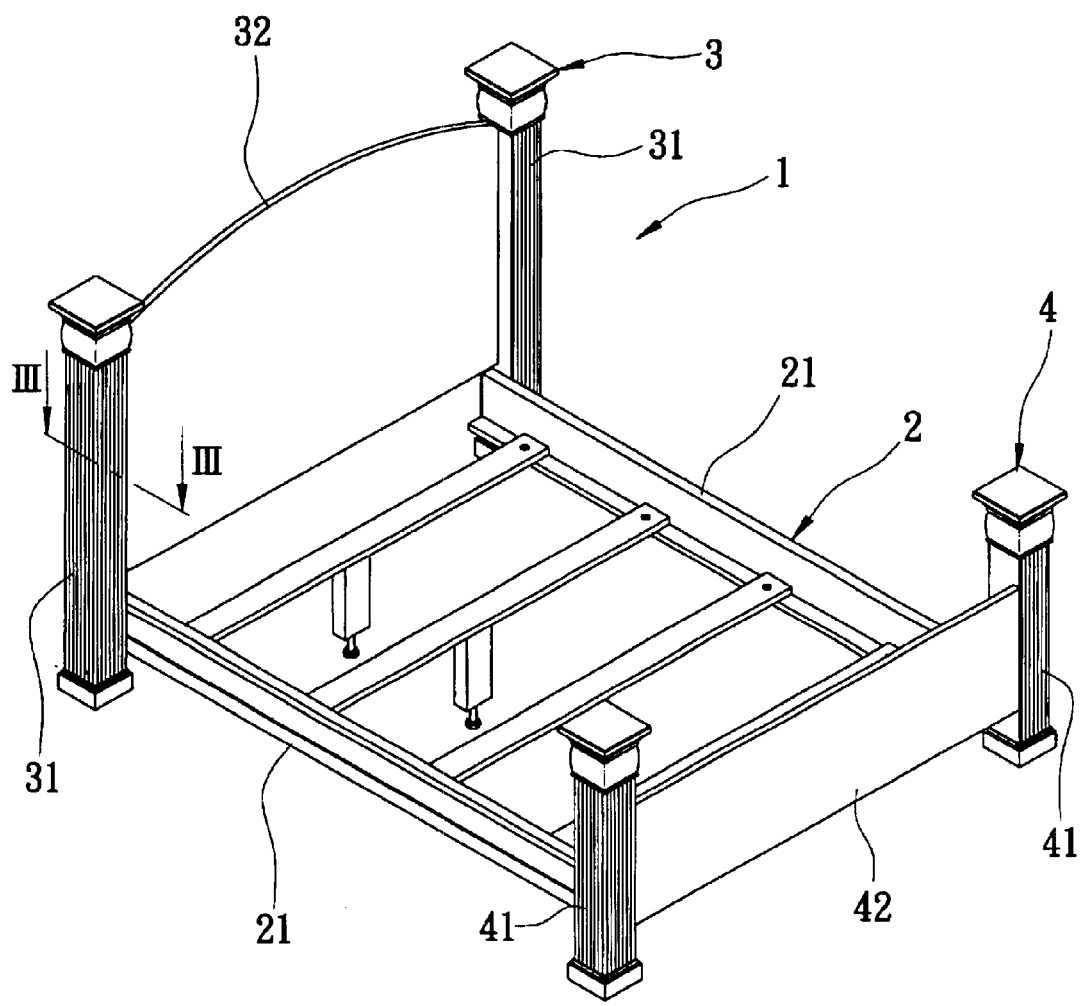
FIG. 1 is a perspective view of a conventional bed assembly.
Figure 2:
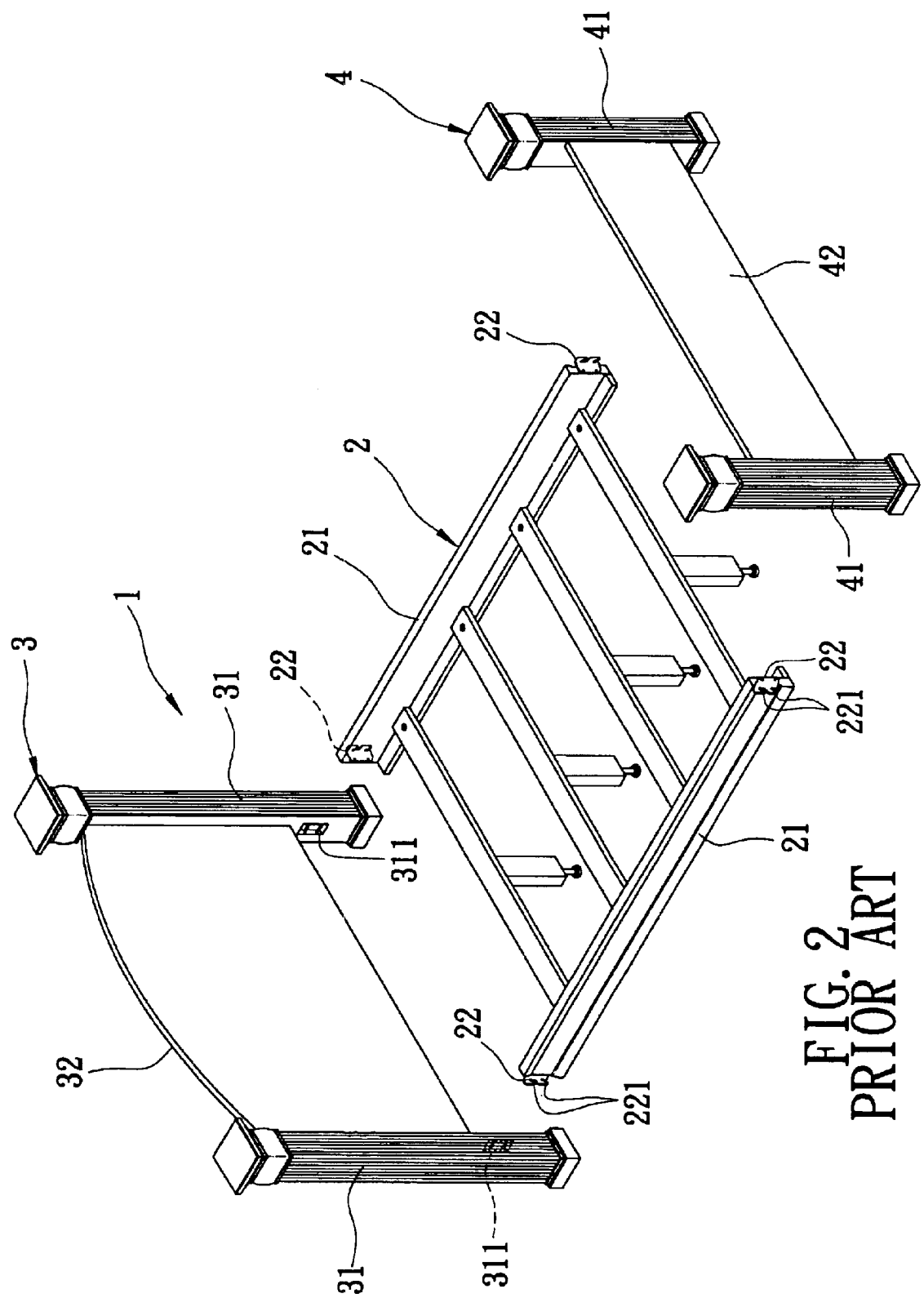
FIG. 2 is a partly exploded perspective view of the conventional bed assembly.
Figure 3:
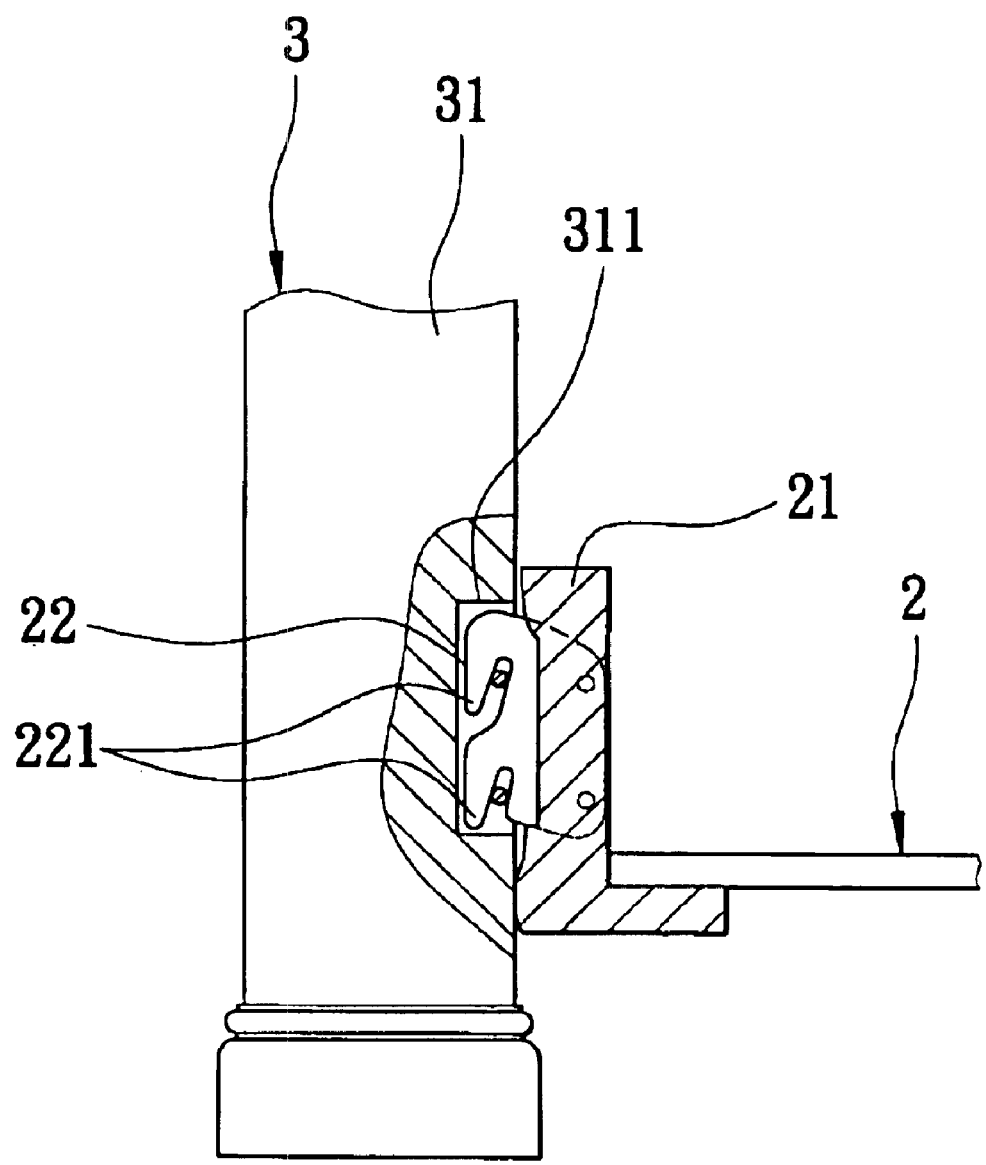
FIG. 3 is a view taken along line III—III of FIG. 1.
Figure 4:
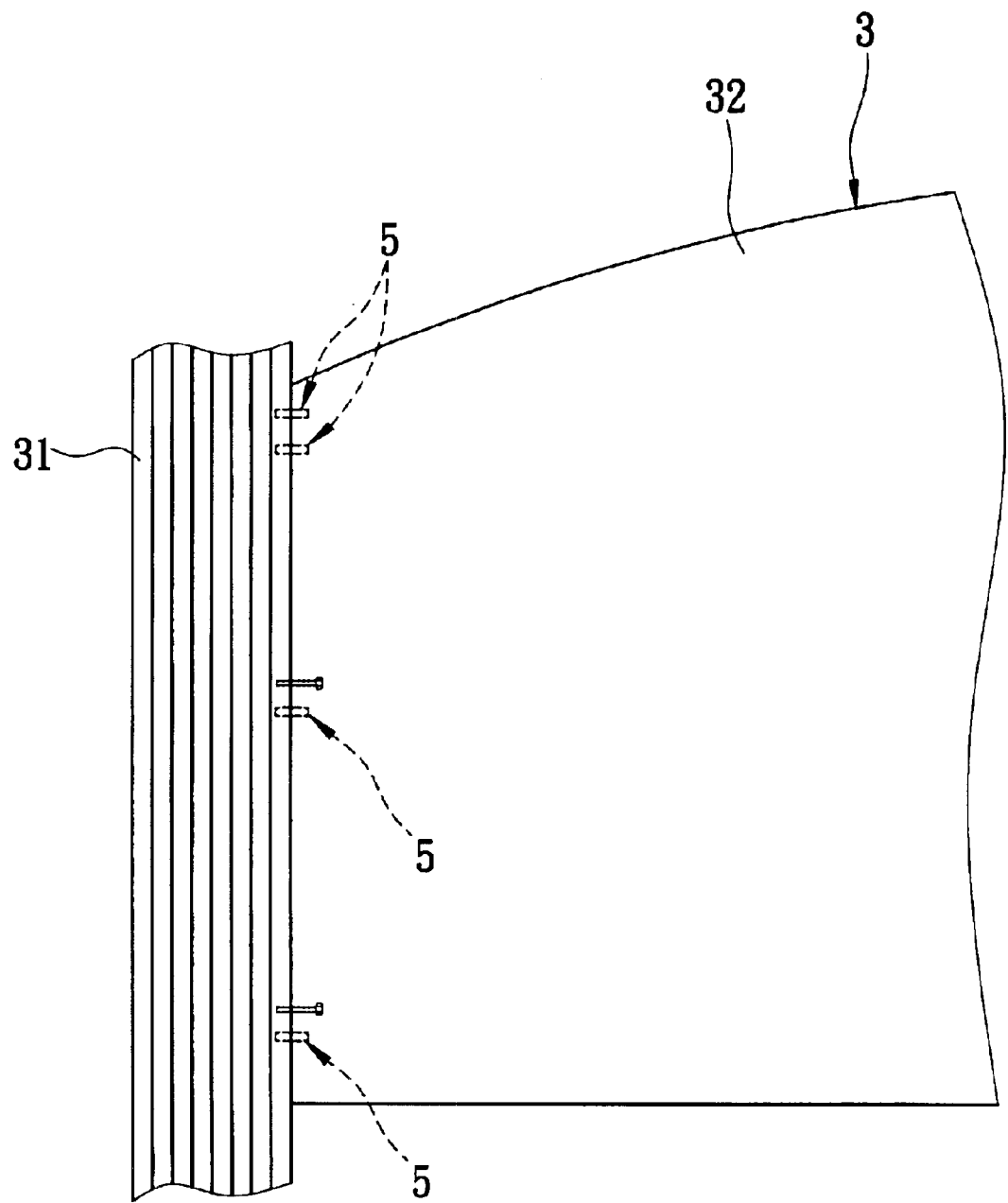
FIG. 4 is a fragmentary schematic view of the conventional bed assembly, illustrating how a front bedpost and a front bed panel are interconnected.

As shown in FIGS. 1 and 2, a conventional bed assembly 1 includes a bed panel assembly 3 or 4 provided at the front or rear side of a main frame 2. The present invention resides in a connection between a bed panel assembly of the above-mentioned type.

Figure 5:
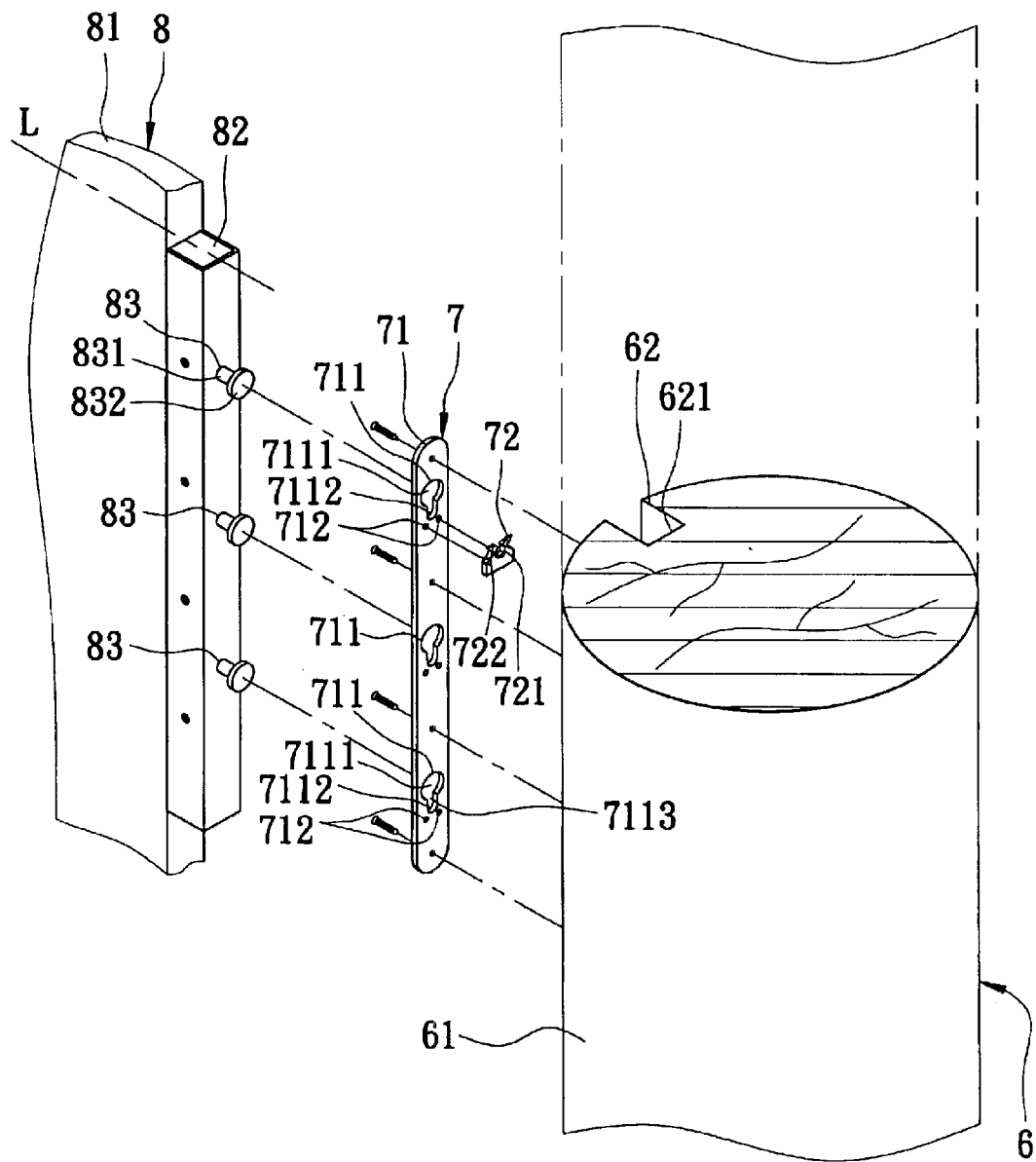
FIG. 5 is a fragmentary partly exploded perspective view of the preferred embodiment of a bed panel assembly according to the present invention.
Figure 6:
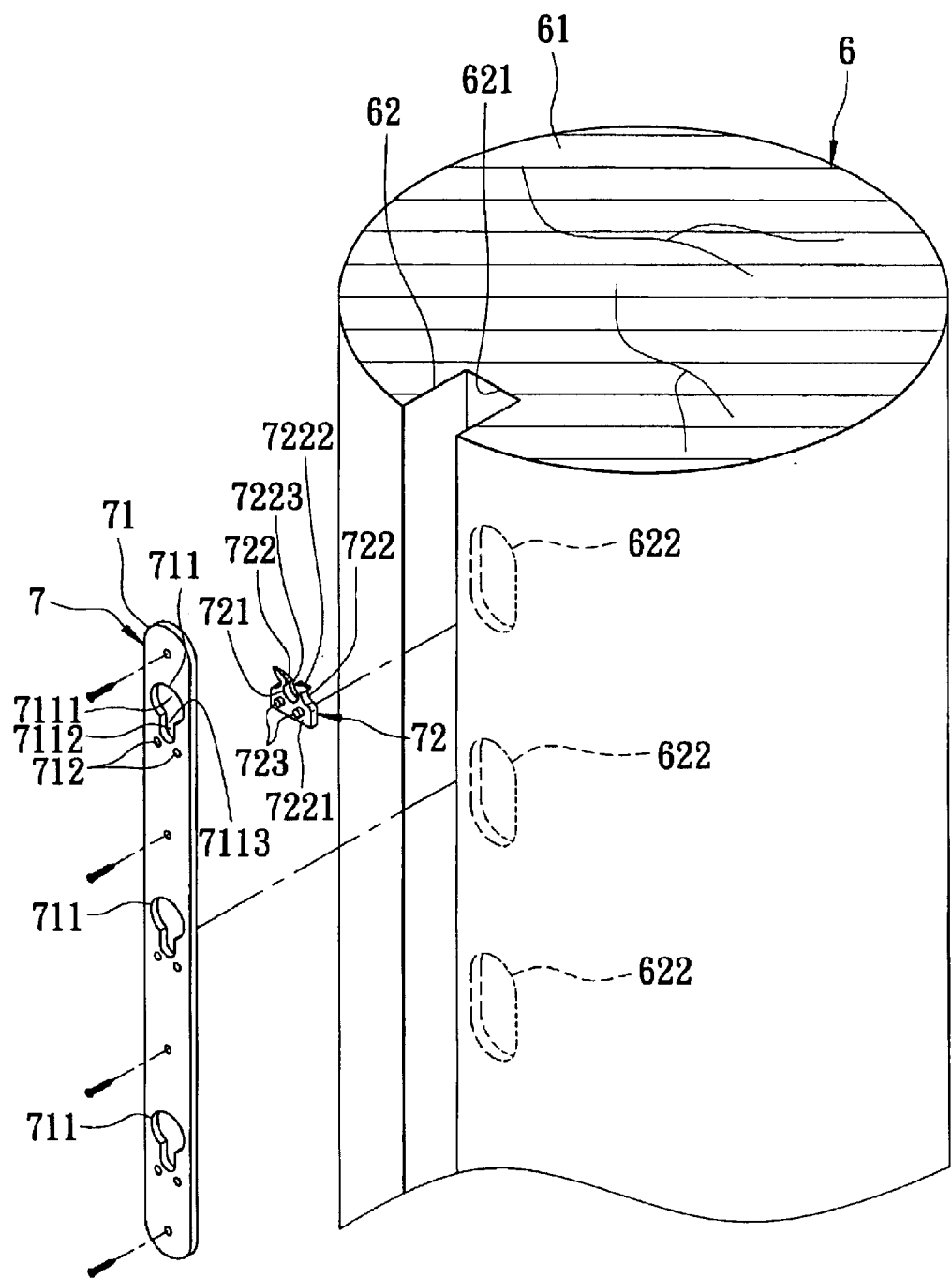
FIG. 6 is another fragmentary partly exploded perspective view of the preferred embodiment, viewed from another angle different from that in FIG. 5.

Referring to FIGS. 5 and 6, the preferred embodiment of a bed panel assembly according to the present invention is shown to comprise a vertical bedpost 6, a retaining unit 7, and a bed panel 8.

The vertical bedpost 6 has a post body 61 connected perpendicularly to a main frame (not shown) in a conventional manner, and an outer surface formed with a groove 62. The groove 62 has a groove bottom face 621. Three vertically aligned oval-shaped recesses 622 are formed in the groove bottom face 621. In this embodiment, the groove 62 has a substantially rectangular cross-section.

Figure 7:
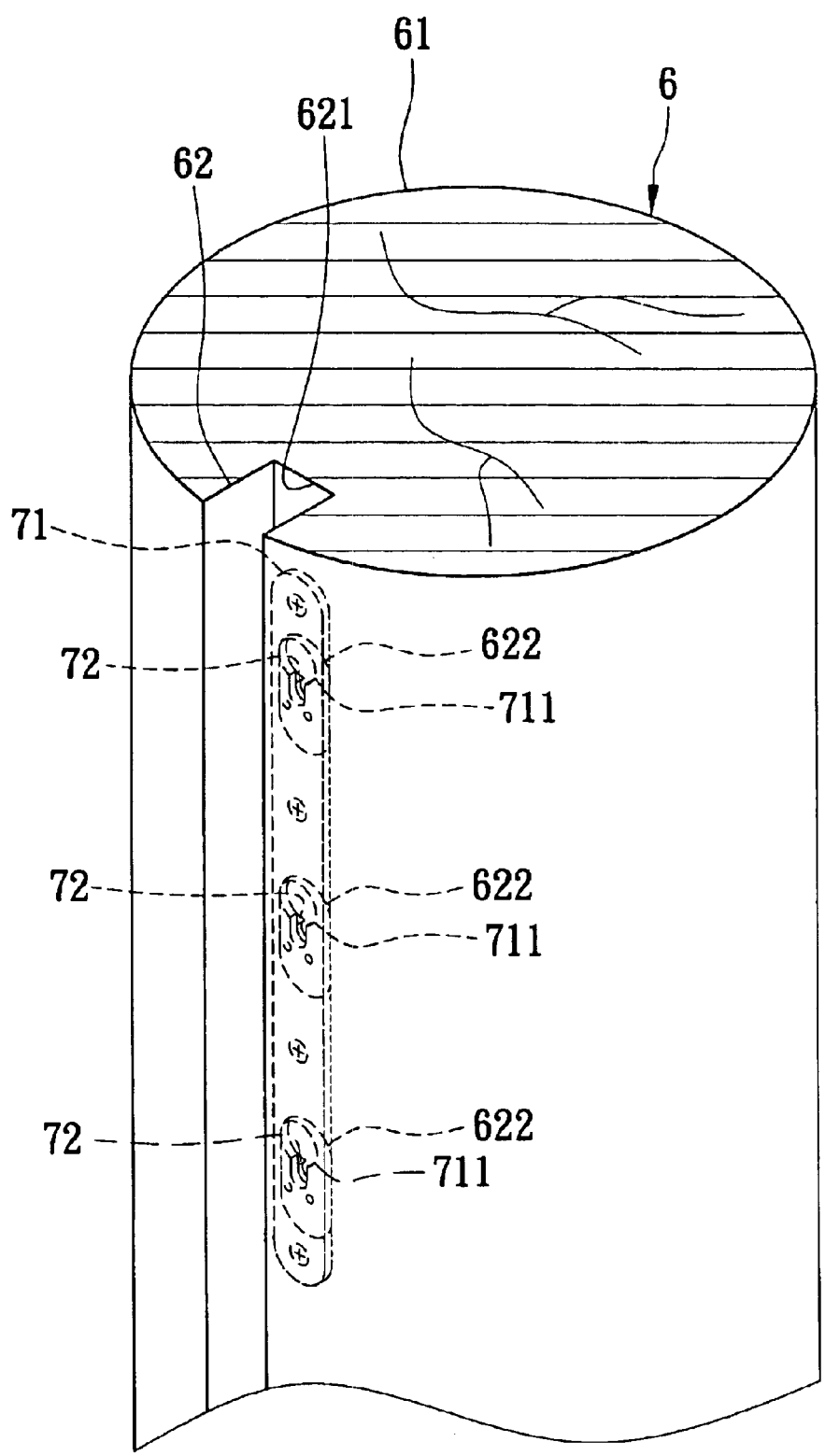
FIG. 7 is a fragmentary perspective view of the preferred embodiment in an assembled state.

With further reference to FIG. 7, the retaining unit 7 is mounted fixedly within the groove 62, and includes an elongate base plate 71 screwed to the groove bottom face 621, and three retainers 72 (only one is shown in FIGS. 5 and 6) connected to and placed in face-to-face contact with the base plate 71. The base plate 71 has three vertically aligned retaining holes 711, and a pair of circular engaging holes 712 formed immediately below and independently of each retaining hole 711. Each of the retaining holes 711 has a large hole section 7111, a small hole section 7112 converging downwardly relative to the large hole section 7111, and a first passage 7113 (see FIGS. 5 and 6) between the large and small hole sections 7111, 7112.

Figure 8:
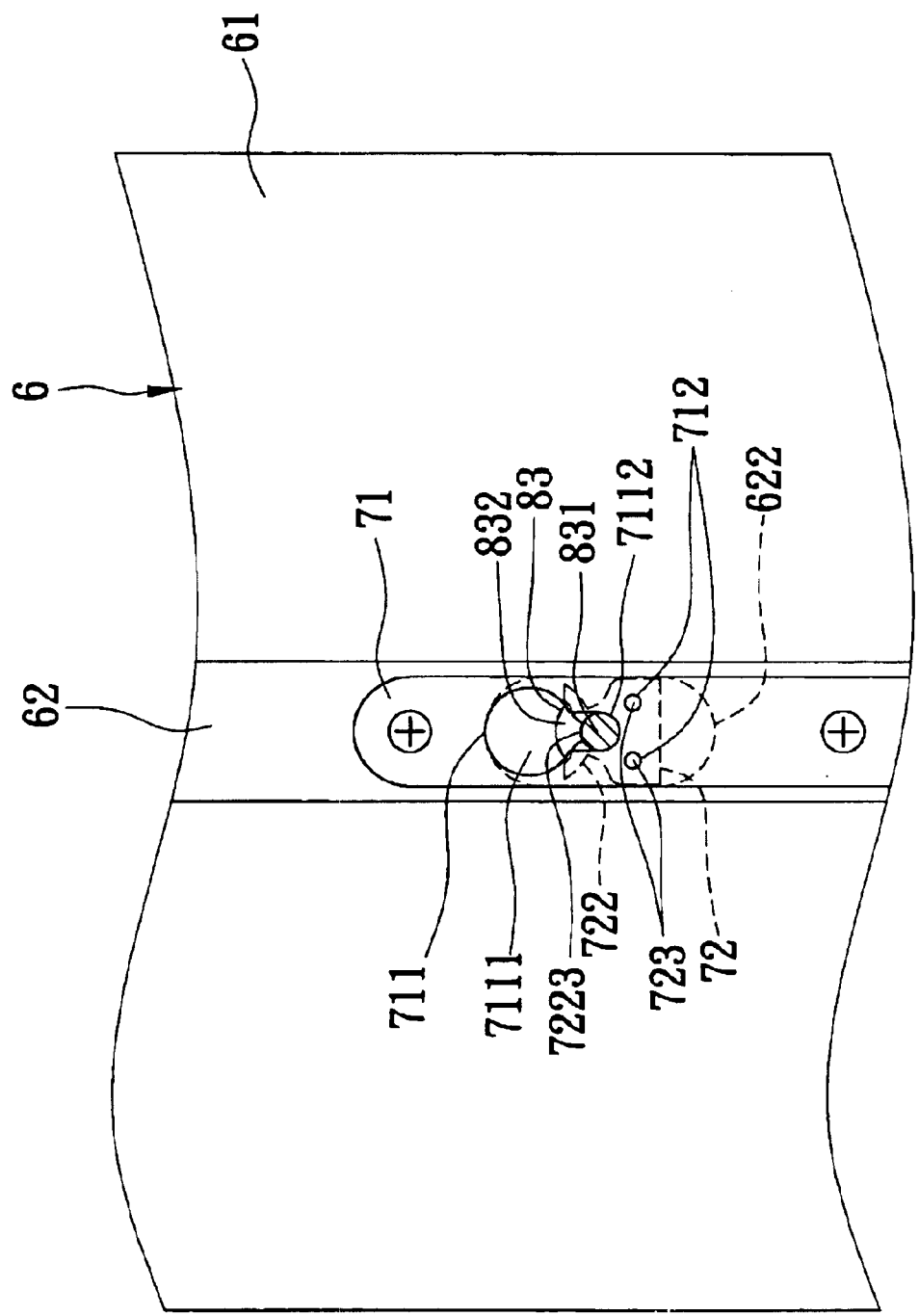
FIG. 8 is a fragmentary schematic view of the preferred embodiment, illustrating how a neck portion of a positioning piece is retained by a retainer.

The retainers 72 are made of a plastic material, such as nylon, and are received respectively in the recesses 622 in the groove bottom face 621. Each of the recesses 622 has a cross-section greater than that of the corresponding retaining hole 711 and greater than that of the corresponding retainer 72, as best illustrated in FIG. 8. Each of the retainers 72 is formed as a one-piece plate, and is disposed between the groove bottom face 621 and the base plate 71. Each retainer 72 has a pair of resilient arms 722 confining a clamping hole 721 substantially in alignment with the small hole section 7112 of the corresponding retaining hole 711, and a pair of studs 723 projecting outwardly from the retainer 72 and engaging respectively a corresponding pair of the engaging holes 712 in the base plate 71. The resilient arms 722 of each retainer 72 respectively include connecting ends 7221 (see FIG. 6) which are interconnected, and free ends 7222 (see FIG. 6) opposite to the connecting ends 7221. The free ends 7222 define therebetween a second passage 7223 (see FIG. 6) substantially in alignment with the first passage 7113 of the corresponding retaining hole 711. The second passage 7223 is narrower than the first passage 7113. Through engagement of the studs 723 with the engaging holes 712, the retainers 72 can be positioned stably and respectively in the recesses 622 in the post body 61 of the bedpost 6.

The bed panel 8 has a panel body 81 extending along a horizontal axis (L). The panel body 81 has a connecting end 82 received in the groove 62 in the post body 61 of the bedpost 6. Three vertically aligned positioning pieces 83 project from the connecting end 82. Each positioning piece 83 has a neck portion 831 connected to the connecting end 82, and a circular head portion 832 opposite to the neck portion 831. The head portion 832 of each positioning piece 83 has a cross-section greater than that of the small hole section 7112, but smaller than that of the large hole section 7111 of the corresponding retaining hole 711 in the base plate 71. The neck portion 831 is substantially equal to the clamping hole 721 in the corresponding retainer 72 in size. The second passage 7223 has a normal size smaller than the cross-section of the neck portion 831 so as to permit retention of the latter in the clamping hole 721.

Figure 9:
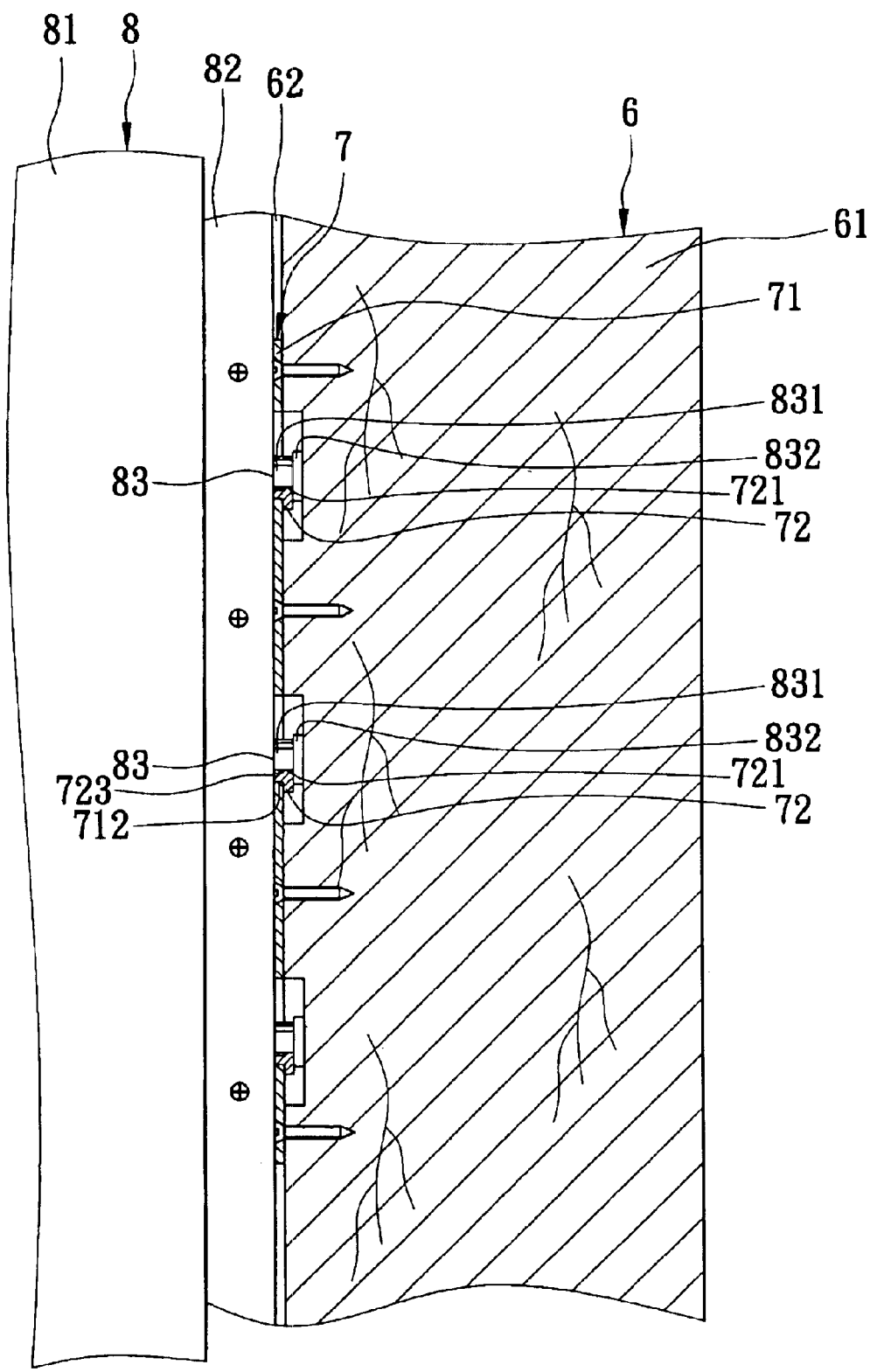
FIG. 9 is a fragmentary assembled sectional view of the preferred embodiment.

After the head portion 832 of each positioning piece 83 is inserted into the corresponding large hole section 7111, the neck portion 831 is movable between the large and small hole sections 7111, 7112 through the first passage 7113, and is received in the clamping hole 721 when the neck portion 831 is disposed in the small hole section 7112. The free ends 7222 of the resilient arms 722 are resiliently movable away from each other to enlarge the second passage 7223 when the neck portion 831 of each positioning piece 83 is forced to pass through the corresponding second passage 7223. Through the resilient arms 722 of the retainers 72, the neck portions 831 of the positioning pieces 83 can be retained in or removed from the respective clamping holes 721 via the second passages 7223, as best shown in FIGS. 8 and 9. As such, the bedpost 6 and the bed panel 8 can be assembled and disassembled with relative ease. Thus, the bedpost 6 and the bed panel 8 of the present invention can be packed individually, thereby reducing handling space requirements and minimizing delivery costs. Upon delivery, the bed panel assembly of the present invention can be assembled and installed on the main frame (not shown) to form the bed assembly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bed panel assembly comprising:
   a vertical bedpost;
   a bed panel having a connecting end, said connecting end having a positioning piece projecting therefrom, said positioning piece having a neck portion connected to said connecting end, and a head portion opposite to said neck portion; and
   a retaining unit mounted on said bedpost, and including a base plate and a retainer secured to and placed in face-to-face contact with said base plate, said base plate having a retaining hole with a large hole section, a small hole section, and a first passage between said large and small hole sections, said retainer having a pair of resilient arms confining a clamping hole substantially in alignment with said small hole section, said resilient arms respectively including connecting ends which are interconnected, and free ends opposite to said connecting ends, said free ends defining therebetween a second passage substantially in alignment with said first passage, said second passage being narrower than said first passage;
   wherein said head portion has a cross-section greater than that of said small hole section and smaller than that of said large hole section, said neck portion being movable between said large and small hole sections through said first passage, said clamping hole receiving said neck portion when said neck portion is disposed in said small hole section, said second passage having a normal size smaller than the cross-section of said neck portion to permit retention of said neck portion, said free ends being resiliently movable away from each other to enlarge said second passage when said neck portion is forced to pass through said second passage.

2. The bed panel assembly as claimed in claim 1, wherein said vertical bedpost has an outer surface formed with a groove, said groove having a groove bottom face, said connecting end of said bed panel being received in said groove, said base plate of said retaining unit being mounted fixedly within said groove between said connecting end and said groove bottom face.

3. The bed panel assembly as claimed in claim 1, wherein said retaining unit includes a plurality of said retaining holes in said base plate, and a plurality of said retainers associated respectively with said retaining holes.

4. The bed panel assembly as claimed in claim 2, wherein said base plate is secured to said groove bottom face, and said retainer is formed as a one-piece plate and is disposed between said groove bottom face and said base plate.

5. The bed panel assembly as claimed in claim 4, wherein said base plate further includes an engaging hole independently of said retaining hole, said retainer having a stud projecting into said engaging hole from said retainer.

6. The bed panel assembly as claimed in claim 4, wherein said vertical bedpost further includes a recess formed in said groove bottom face to receive said retainer, said recess having a cross-section greater than that of said retaining hole and greater than that of said retainer.

* * * * *